(12) United States Patent
Stephens

(10) Patent No.: US 6,719,303 B2
(45) Date of Patent: Apr. 13, 2004

(54) DRILL STRING CHUCK

(75) Inventor: John Thomas Stephens, Couer d'alene, ID (US)

(73) Assignee: Boart Longyear International Holdings, Inc., Salt Lake City, UT (US)

(*) Notice: Subject to any disclaimer, the term of this patent is extended or adjusted under 35 U.S.C. 154(b) by 192 days.

(21) Appl. No.: 10/066,237

(22) Filed: Oct. 26, 2001

(65) Prior Publication Data

US 2003/0080520 A1 May 1, 2003

(51) Int. Cl.⁷ .............................................. B23B 31/30
(52) U.S. Cl. ............................ 279/4.12; 279/57; 279/74
(58) Field of Search .............................. 279/4.12, 4.1, 279/57, 74, 121; 173/149

(56) References Cited

U.S. PATENT DOCUMENTS

| | | | | |
|---|---|---|---|---|
| 3,083,025 A | * | 3/1963 | Herbkersman | 279/122 |
| 3,456,956 A | * | 7/1969 | Herbkersman | 279/4.12 |
| 3,692,320 A | | 9/1972 | Lindelof et al. | |
| 3,792,869 A | * | 2/1974 | Braun | 279/4.12 |
| 3,992,019 A | * | 11/1976 | Crawshay | 279/4.12 |
| 4,273,200 A | * | 6/1981 | Lambot | 279/4.12 |
| 4,393,945 A | * | 7/1983 | Rassieur | 173/213 |
| 4,669,362 A | * | 6/1987 | Nobukawa et al. | 94/467 |
| 4,844,489 A | * | 7/1989 | Acker et al. | 279/4.06 |
| 5,125,776 A | | 6/1992 | Muller et al. | |
| 5,954,346 A | | 9/1999 | McLaren | |
| 6,516,696 B2 | * | 2/2003 | Cotter | 83/588 |

\* cited by examiner

Primary Examiner—Daniel W. Howell

(57) ABSTRACT

A drill rod chuck in which the closing of the jaws is effected through the use of gas springs mounted in the slidable jaw actuating jaw bowl. Further the jaws are supported by bushings against cantilever loading during drilling and the jaws are positively advanced and retracted through slidable interengagement with the jaw bowl.

23 Claims, 9 Drawing Sheets

DRILL STRING CHUCK

FIELD OF THE INVENTION

This invention relates to a chuck for rotating a drill string.

BACKGROUND OF THE INVENTION

To investigate geological structures, holes are drilled into the ground utilizing a drill string that carries a drill bit at one end. The drill string is made up of a number of drill rods threaded together with each of the drill rods typically being in the order of ten feet in length. In conventional drilling, a drill rig is employed which allows the rods of the drill string to be assembled end to end and provides for the rotation of the drill string. Rotation is imparted to the rods by a drill chuck that engages the outer surface of one of the rods and transmits torque to the rod from the drive unit. The position of the chuck on the rod must be adjustable so that as the string penetrates the ground the chuck can be released, moved along the rod, and reengaged.

In conventional drill rod chucks, the jaws of the chucks are moved to a closed position gripping the drill rod under the force of large a number of preloaded coiled springs or Belleville washers. An hydraulically actuated operator is utilized to compress the coiled springs or Belleville washers to thereby release the jaws from their closed drill rod gripping position and to open them for advance of the drill rod therethrough.

To provide adequate drill gripping force to rotate the drill string in the case of the coiled springs, a large number of springs are required, e.g. some 22 coiled springs, which have a significant height of 8 to 12 inches. Again, with the Belleville washers, a large number of stacks of washers, e.g. 18 stacks, of heights comparable to the coiled springs are required.

To accommodate the large number of springs or washer stacks conventional chucks are necessarily large, heavy and costly.

One of the problems with conventional chucks is that, in use over time, the initial force imparted by the coiled springs or Belleville washers deteriorates reducing the grip and hence the positiveness of the drive to the drill rod. Moreover, such deterioration is nonuniform from spring to spring so that the grip of the chuck jaws is not uniform around the rod.

Further, the force exerted by the coil springs or the Belleville washers is inherently less when they are extended so that in time worn drill rods may even slip through the chuck.

It will be understood that in order to provide the required chuck closing force, the springs or washers must be preloaded when assembled into the chuck so that they are under compressive force between a fixed surface or pressure pad and the jaw actuator. As a result, the chuck has a dangerous potential to fly apart and cause serious injury, for instance, when a retaining bolt is removed or bolt threads are stripped.

Again, in conventional chucks the bearing between the axially moveable non-rotating hydraulic operator and the chuck actuator is maintained in contact with the chuck actuator with the chuck in the closed position and driving the drill string from the drill rotation or drive unit. This results in generating very significant heat during the drilling operation. This heat added to the heat generated by the chuck driving unit renders their surfaces dangerous to the operator and capable of causing serious burns.

A further problem with conventional chucks is that, not only are the coiled springs or Belleville washers inherently subject to different rates of loss of resiliency or compressive forces as mentioned above, but they operate in an environment where they are subject to deterioration through corrosive damage due to contact with water and sludge shortening useful spring and washer life.

A still further problem with conventional chucks is that the jaws are not adequaately supported against the high cantilever and twisting forces causing loss of grip, eccentricity, run out virations, and jamming.

It is the object of the present invention to overcome the above disadvantages as well as others of conventional chucks as will hereinafter appear.

SUMMARY OF THE INVENTION

One important aspect of the present invention resides in eliminating the use of mechanical springs or washers with their inherent limitations and instead utilizes compressed gas to provide the force to close the chuck jaws to grip the drill rod.

With the utilization of compressed gas to provide the force to close the jaws of the chuck on a drill rod of a drill string, it has been found that the closing pressure can be both accurately set yet altered as desired. Further, the jaws can be moved uniformly to close on the drill rod to provide a balanced or uniform grip around the rod while maintaining an essentially constant gripping force throughout the jaw travel. As a result, the jaws can grip rods of different diameters with essentially equal and sufficient force not only to provide the requisite torque transfer regardless of such variations in drill rod diameters.

More particularly, in keeping with this aspect of the invention, the chuck actuator which moves axially longitudinally of the spindle to open and close the jaws is operated in the jaw closing direction by a source of compressed gas in the form of a plurality of compressed gas springs disposed symmetrically around the chuck actuator and acting between the jaw actuator and a suitable stop surface or pressure pad fixed to the spindle.

Compressed gas springs are commercially available and comprise cylinders into which compressed gas, eg. nitrogen, is introduced. The compressed gas forces a slideable small diameter cylindrical plunger or piston outwardly to a maximum position. Under the application of a force on the outer end of the plunger, the plunger can be displaced telescopically back into the cylinder against the force of the contained compressed gas. The travel of the plunger from its point of maximum projection to its point where it is fully retracted is the stroke of the plunger. Such gas springs using compressed nitrogen gas are sold, for example, by Hyson Products. These gas springs are extremely compact and provide much more force in a very much smaller area than conventional mechanical springs. For instance, a nitrogen gas spring having a diameter of 2¾ inches can provide the same force as from 8 to 10 coiled springs having a diameter of 2 inches.

In the case of coiled springs, for optimum life the springs should not be deflected more than 25% of their total length. Therefore, in the case of an application requiring a 3 inch stroke, the height of the spring should be 12 inches.

For a corresponding 3 inch stroke, the height of a gas spring is almost half that of the coiled spring.

It will be understood that on contact with the plunger of a gas spring the full force of the compressed gas in the cylinder is available to resist inward movement of the plunger whereas in a coiled spring, unless it is preloaded, there is no force on simple contact with the spring.

Moreover, gas springs provide a nearly constant force resisting inward movement throughout the stroke of the plunger.

In addition, as the compressed gas within the cylinder of the gas spring is trapped from escaping, unlike coiled springs or washers whose force deteriorates with age and use, the force exerted by the gas spring remains constant with time and regardless of the frequency of its use. On the other hand, the force of the spring can be altered as desired by introducing a measured amount of compressed gas, eg. nitrogen gas, into the cylinder or exhausting a measured amount if desired. Thus, each spring can be calibrated to provide a precise spring force so that a number of identical gas springs having precisely the same spring force and other characteristics can be provided.

The jaws are moved by a jaw actuator in the form of a bowl or ring which cooperates with the jaws which are arranged at equally spaced intervals symmetrically around the spindle in a circular configuration. The jaw actuator or bowl opens the jaws as it is moved upwardly under hydraulic force and closes the jaws as it is moved downwardly under the force of a highly efficient compact arrangement of gas springs.

More particularly, according to the preferred form of the invention utilizing gas springs, the gas spring arrangement comprises a series of individual equally spaced gas springs arranged in a circle around the actuator bowl between the chuck jaws with the cylinders of the springs embedded in the upper end of the actuator and their plungers or pistons engaging a fixed surface or pressure pad secured to the end of the spindle.

This arrangement results in an extremely compact chuck and with the gas springs which have identical strokes charged with the same gas pressure selected to give the desired jaw force, the chuck is precisely balanced to provide a uniform gripping force around the drill rod. Moreover, this gripping force remains essentially constant for different drill rod sizes.

Another important aspect of the invention resides in the support system for the chuck jaws to prevent their displacement under the cantilever loads generated during the drilling operation.

According to this aspect of the invention, the jaws are held from rocking by a set of bushings selected for the size of the drill rod to be driven. Each bushing set comprises a lower bushing supported within the spindle beneath the bottom of the jaws and an upper bushing mounted to extend into the spindle to overlie the top of the jaws, the arrangement being such that the jaws can slide radially in and out of rod gripping and rod releasing positions but are prevented from tipping either up or down.

To provide positive open and closing jaw movement under sliding movement of the ring actuator, according to the preferred form of the invention, the rear edges of the jaws are beveled outwardly from their upper end to their lower end preferably at an angle of 15 degrees and are provided with similarly slanted key ways in their side faces adjacent their rear edges. The actuator in turn is provided with correspondingly slanted or beveled slots to receive the rear edges of the jaws with the side walls of the slots having projecting ribs or keys to engage in the jaw key ways. The walls of the slots themselves engage the sides of the jaws to preclude their twisting.

Because the jaws and actuator ring rotate with the spindle while the hydraulic operator does not rotate, a ball thrust bearing is interposed between the hydraulic operator and the actuator.

Another aspect of the present invention is the provision for the hydraulic operator to withdraw the thrust bearing out of contact with the actuator with the jaws closed to eliminate the intense heat at the bearing which occurs in conventional chucks during drill string rotation. As a result, the bearing is cool and can be serviced if required during the drilling operations.

Further, in this connection, the invention provides for a labyrinth seal between the hydraulic operator and the jaw actuator to prevent the expulsion of jaw lubricant or the ingress of water.

With this sealing arrangement containing outflow loss of lubricant, the invention also provides a jaw lubricating system which not only provides for lubrication of the jaws by also provides for lubricant flow between the jaws so that all jaws are properly lubricated at all times.

To ensure accurate relative positioning of the spindle actuator and other components at all times the invention also provides a guide pin arrangement which prevents jamming of the jaws so that they can easily be removed and replaced in the actuator bowl and to ensure that there is no misalignment of the springs.

Again, according to a preferred form of the invention provision is made to block any water flow entering the jaws from flowing down the spindle and discharging it out of the chuck by centrifugal force.

In still another aspect of the invention, the carbide grippers in the jaws utilize an angled tooth pattern which increases the gripping strength of the jaws since each tooth has a separate "plow" path through the rod material. If the teeth are in-line, grip failure will occur when the material around each tooth deforms to the point where only the first tooth is in contact with parent rod material.

BRIEF DESCRIPTION OF THE DRAWINGS

These and other features and advantages of the present invention will be understood from the following detailed description taken in conjunction with the accompanying drawings

DETAILED DESCRIPTION ACCORDING TO
THE PREFERRED EMBODIMENTS OF THE
PRESENT INVENTION

Figure 1:
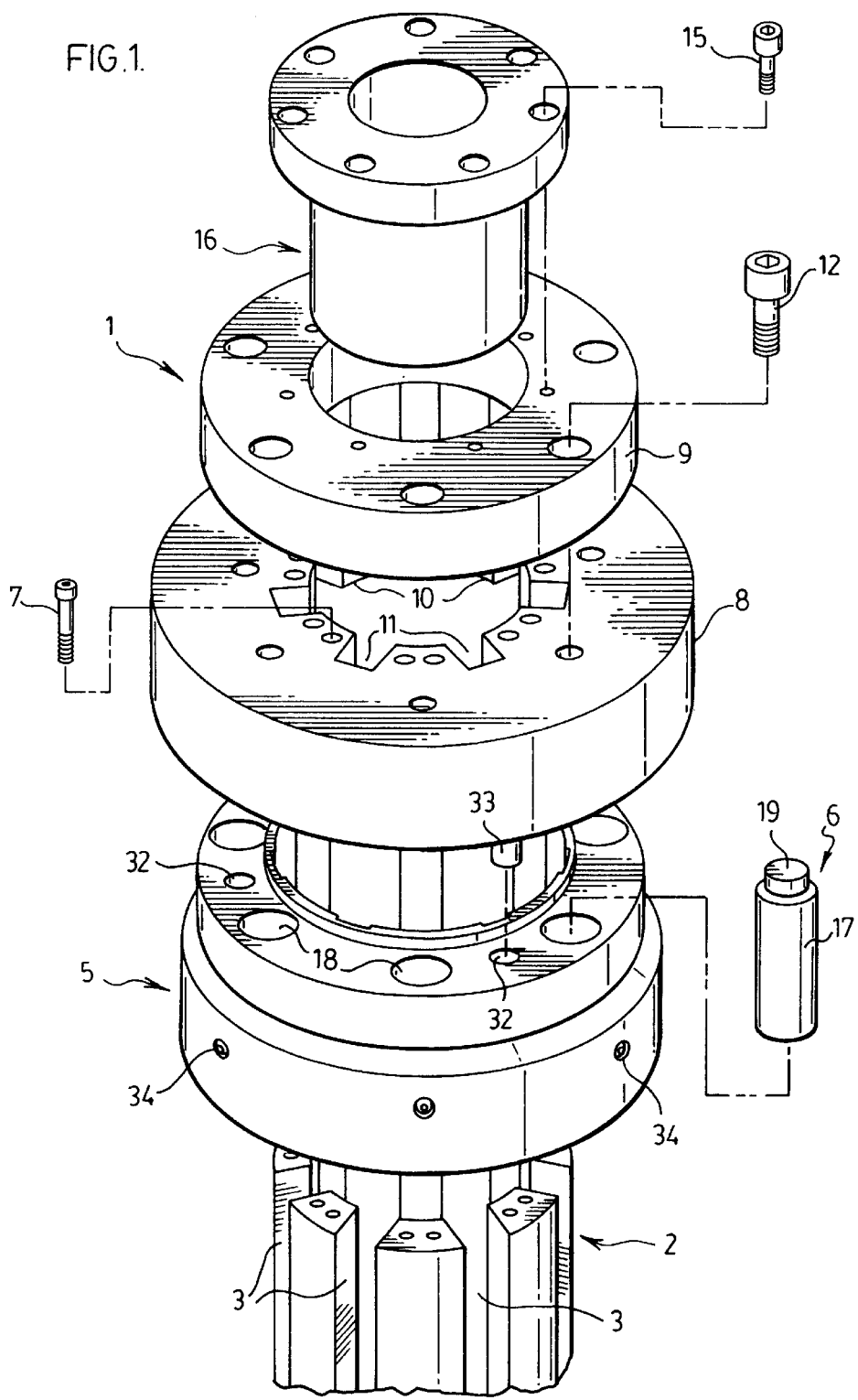
FIG. 1 is an exploded perspective view of a preferred form of chuck according to the invention
Figure 2:
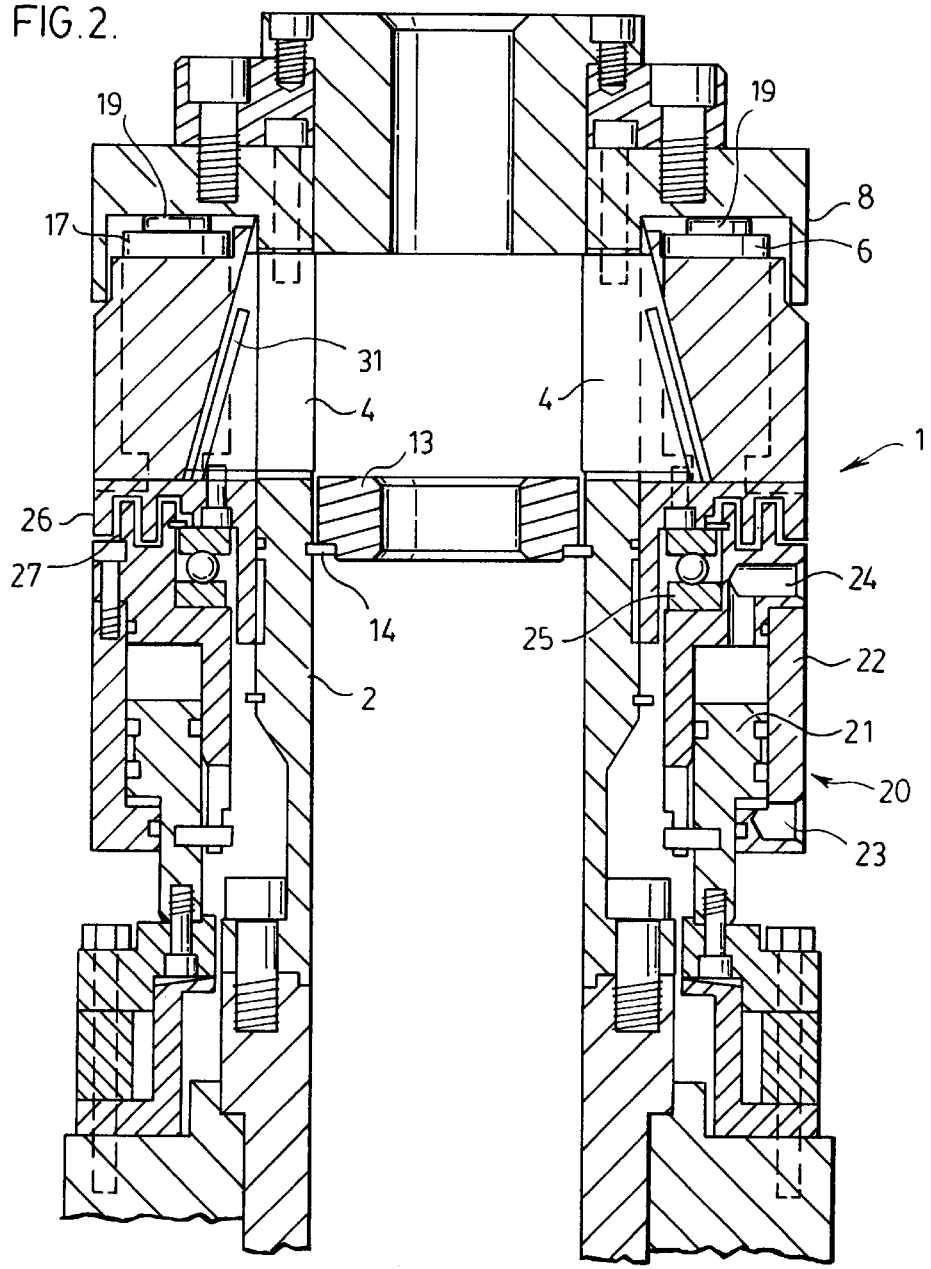
FIG. 2 is a vertical sectional view of the assembled chuck of FIG. 1 with the jaws in the open position ready to receive a drill rod to be passed therethrough.
Figure 3:
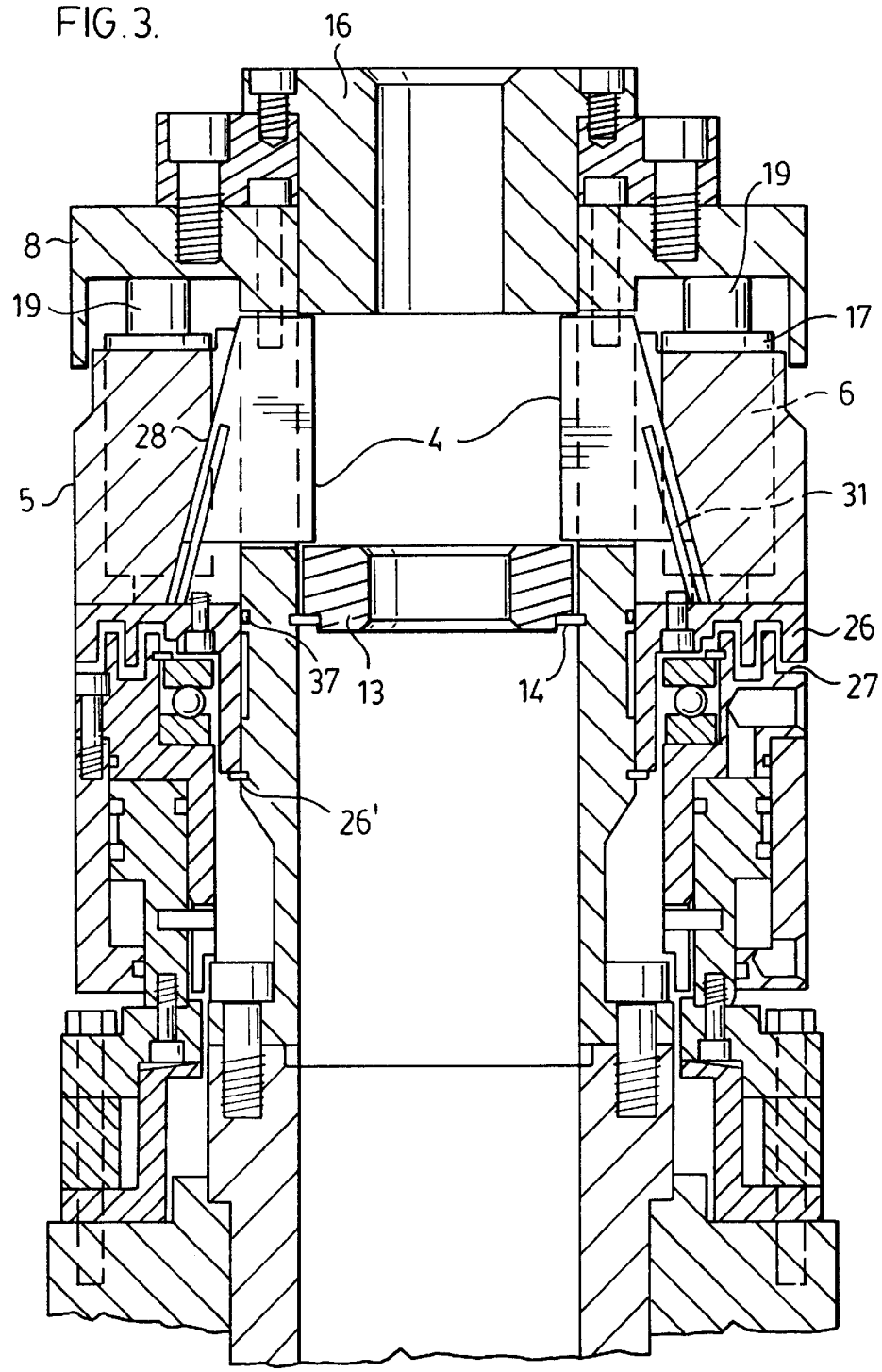
FIG. 3 is a view similar to FIG. 2 but showing the chuck jaws in the closed drill rod gripping position.

With reference to FIGS. 1, 2 and 3, the chuck generally designated at 1 according to the preferred form of the invention comprises a spindle 2 formed with slots 3 in its upper end to receive jaws 4 mounted in a jaw bowl or actuator 5 slideably mounted on the spindle 2.

Overlying the jaw bowl 5 and secured to the upper end of the spindle 2 by fastener 7 is a spring pressure pad or stop member 8.

Overlying the pressure pad 8 is a cap 9 having depending legs 10 which project downwardly through notches 11 in the pressure pad 8 into the upper ends of the slots 3 in the upper end of the spindle 2.

The cap 9 is secured to the pressure pad 8 by suitable fasteners 12.

At the bottom of the slots 3 of the spindle 2, the spindle is provided with an internal lower bushing 13 secured in place by a stop ring 14.

Secured to the cap 9 by suitable fastener 15 is an upper bushing 16 which extends down into the upper end of the spindle 2.

The jaws 4 when mounted in the spindle slots 3 fit beneath the legs 10 of the cap which legs prevent upward movement of the jaws when they are being retracted from the drill rod gripping position. When the jaws are projected into the spindle into drill rod gripping position, they are supported at the bottom by the lower bushing 13 and at the top by the upper bushing 16 (and as well by the cap legs 10) to securely support them against the cantilever forces generated during the drilling operation when the jaws 4 are closed on the drill rod. It will be understood that the inner diameter of the bushings 13 and 16 is such that the drill rod can be passed therethrough without interference.

As hereinafter more fully explained, movement of the slideable jaw bowl or actuator 5 downwardly acts to close the jaws moving them inwardly of the spindle slots 3 to grip a drill rod when same is introduced through the chuck.

On the other hand, upward movement of the jaw bowl or actuator 5 will withdraw the jaws from the gripping position.

The gas springs 6 whose cylinders 17 are embedded and protected in cylindrical pockets 18 in the jaw actuator 5 have their pistons 19 acting against the underside of the pressure pad 8 to displace the jaw bowl downwardly to the jaw closing position.

To release the jaws an hydraulic operator 20 is employed.

The hydraulic operator has a fixed piston 21 and a moveable cylinder 22 in communication with a lower port 23 and an upper port 24. When hydraulic fluid is pumped into the upper port 24, it will cause the cylinder to move upwardly against the action of the gas springs to withdraw the jaws from gripping relation. During this operation, the lower port is an exhaust port.

The relationship of the ports is reversed to effect downward movement of the cylinder 22 allowing the gas springs to take over to depress the jaw bowl or actuator 5 to move the jaws inwardly into drill rod gripping position.

Figure 4:
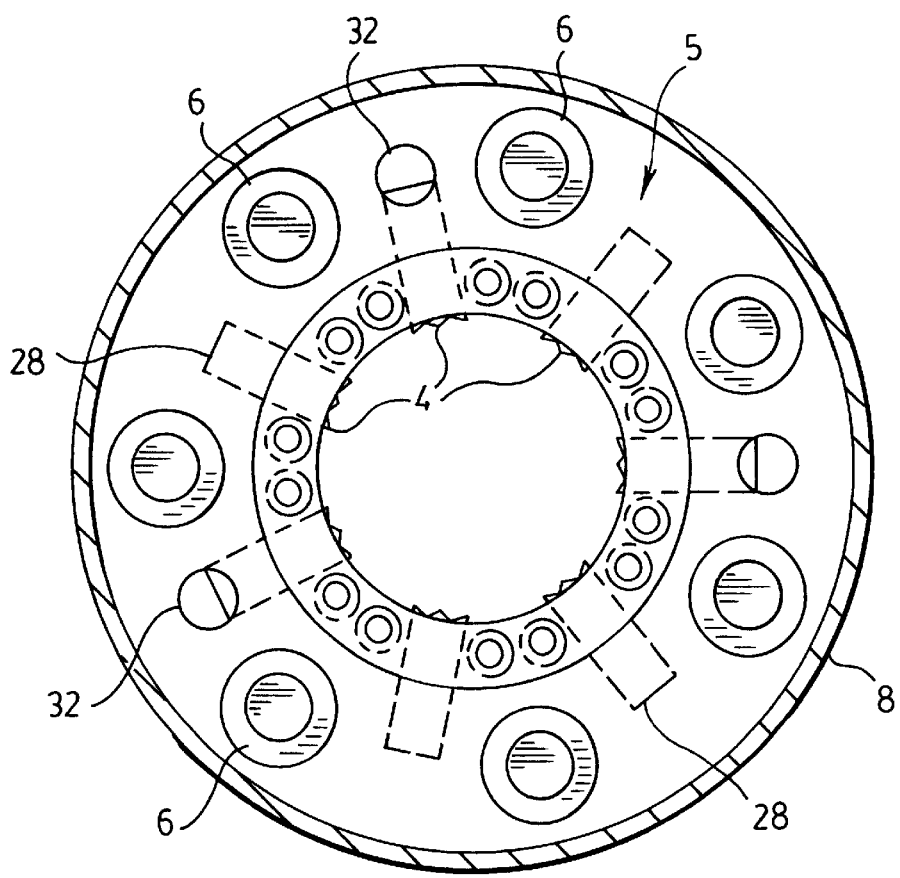
FIG. 4 is a horizontal section taken on a line for 4 of FIG. 2.

As seen in FIG. 4, according to the preferred form of the invention, the chuck is provided with seven jaws 4 equally circumferentially spaced and seven gas springs 6 again equally circumferentially spaced in between the jaws.

Inasmuch as the hydraulic operator 20 is stationary while the jaw actuator, the jaws, and other components fixed to the spindle are rotating, the upward force exerted by the hydraulic operator 20 to release the jaws is effected through a roller bearing 25 which acts against a labyrinth seal plate 26 fixed to the bottom of the jaw bowl 5, the seal plate 26 and cylinder 22 being configured to provide the tortuous passage 27 to prevent the outflow of grease from the system under centrifugal force and to prevent the ingress of moisture into the chuck.

It will be noted that when the hydraulic operator 20 is actuated to move downwardly to free the jaw bowl 5 to move downwardly under the action of the gas spring 6 the downward movement of the bowl is limited by the seal plate 26 hitting the stop ring 26' (FIG. 3) allowing the bearing 25 to be withdrawn from contact with the chuck moving parts when the jaws of the chuck are in the closed position. This arrangement eliminates the typical heat generated by a loaded bearing during drilling which heat conventionally adds to that already being generated in the drill rotation unit to which the chuck is attached. As a result the typical heat build up with conventional chucks is so severe that touching of the surface of either the chuck or the rotation unit will cause serious burns after only a few minutes of running time. With the present invention, the chuck remains cool allowing maintenance at any time without the potential of bum injuries. Again, because the chuck remains cool, the insulation between the spindle and rotational unit is greatly simplified.

To provide for movement of the jaws 4 to grip and release the drill string on sliding movement of the jaw bowl or actuator 5 on the spindle 2, the jaw bowl 5 is provided with a series of circumferentially spaced undercut slots 28 which match the slots 3 in the upper end of the spindle 2 as shown in FIG. 4.

Figure 5:
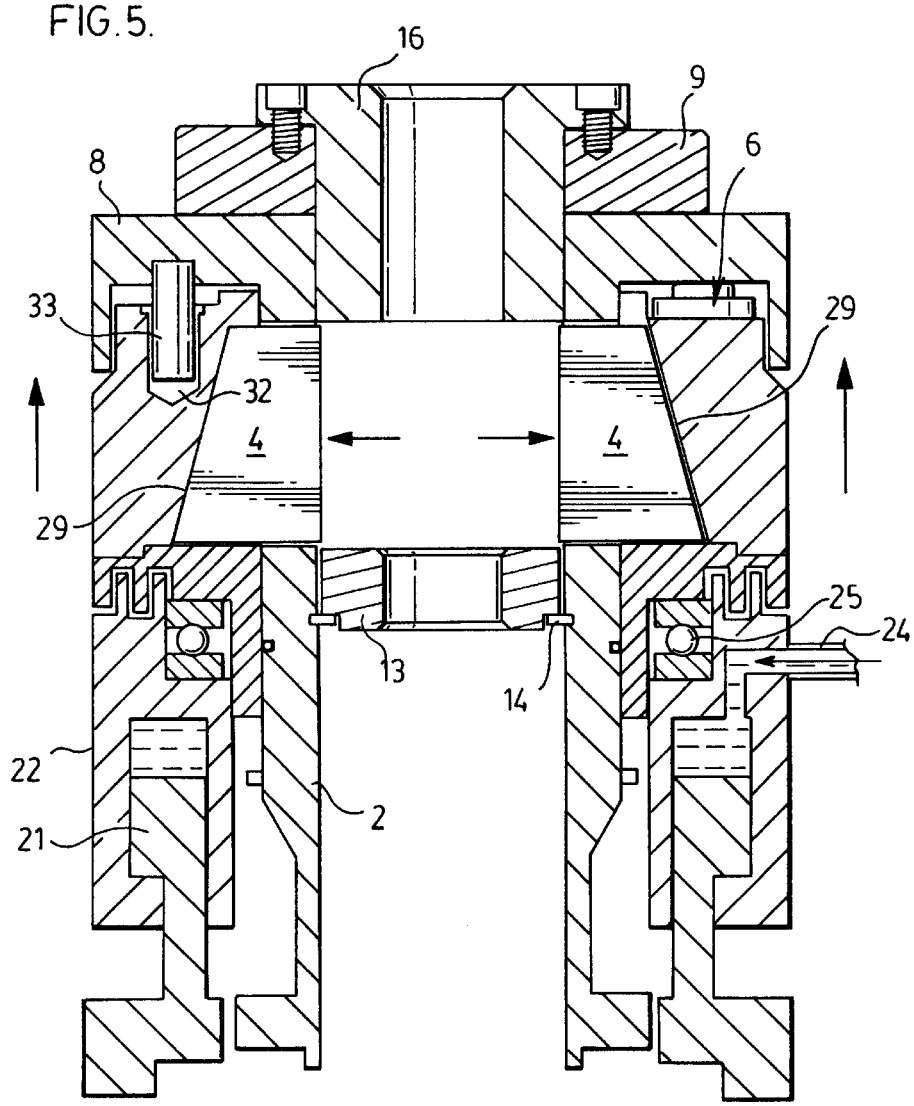
FIG. 5 is a vertical sectional view taken on the line 5—5 of FIG. 4.
Figure 10:
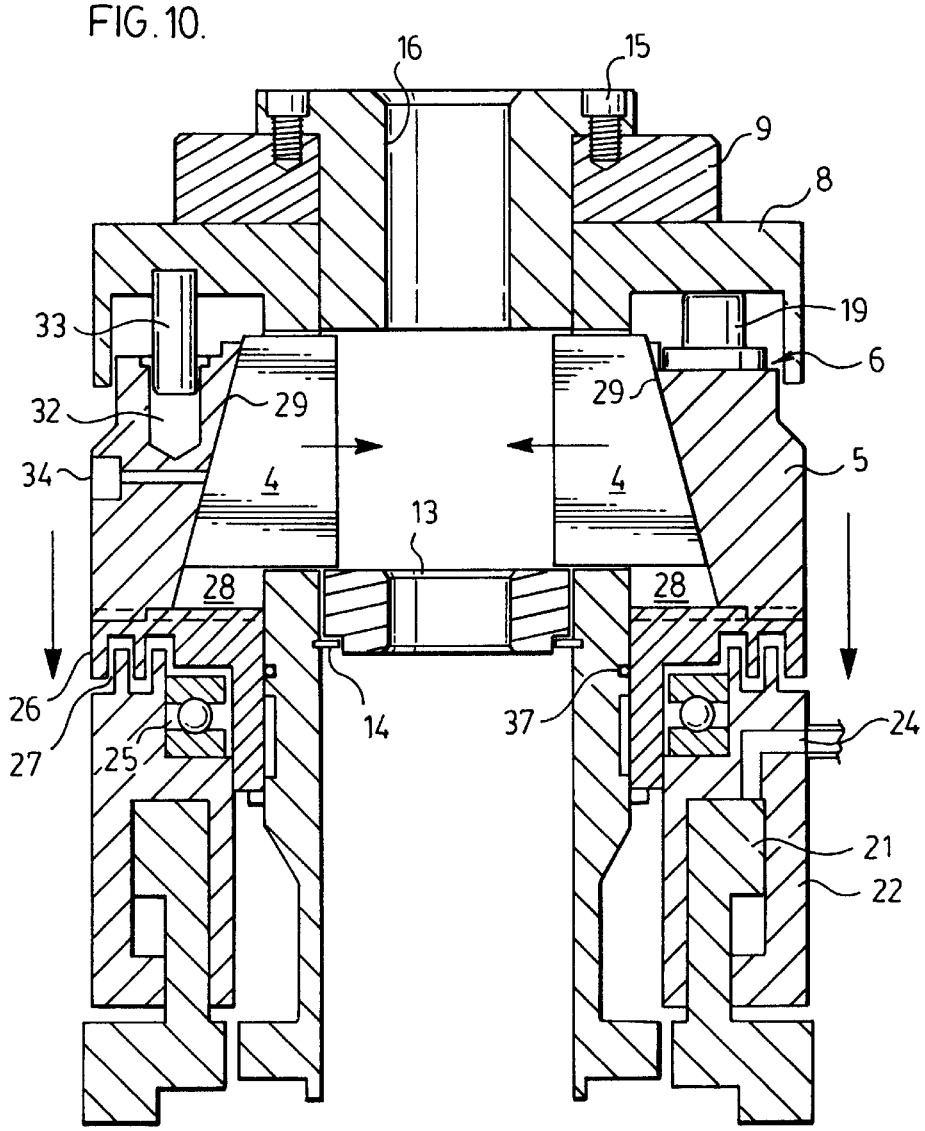
FIG. 10 is a vertical sectional view showing the jaws closed in drill rod gripping postion.

As illustrated in FIG. 5, the jaws 4 have a rear edge 29 which slopes downwardly and outwardly from the top of the jaws to precisely match the undercut of the slots 28. With this arrangement, it will be understood that as the actuator 5 is moved downwardly under the action of the springs 6, as shown in FIG. 10, the jaws 4 will be forced inwardly by virtue of the sloping formations of the rear edges of the jaws and the undercut of the slots 28.

Upward movement of the jaw bowl 5 effects retraction of the jaws from drill rod gripping relation to the drill string gripping position.

To provide positive jaw retraction, the sidewalls of the slots which hold the jaws from twisting under rotation of the chuck and drill string while drilling interact with the jaws as follows.

Figure 8:
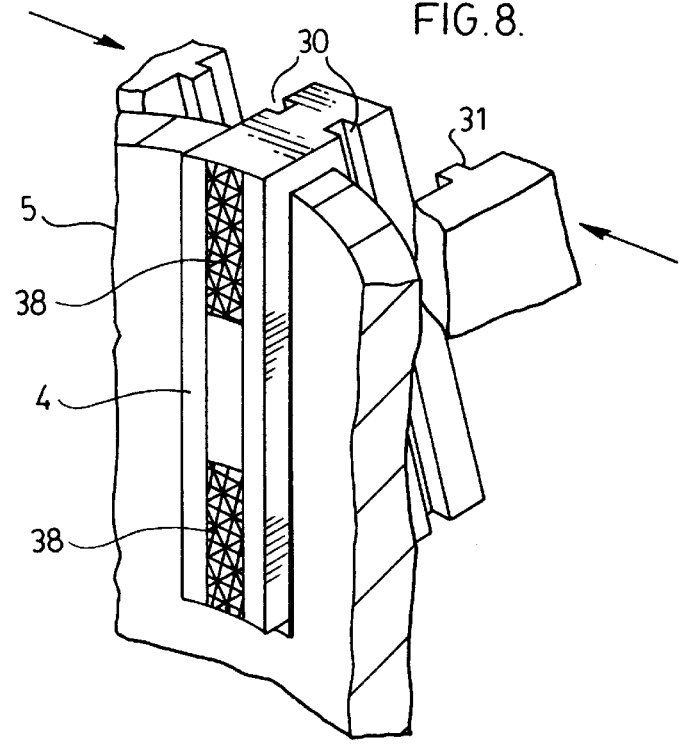
FIG. 8 is a broken away exploded perspective view illustrating the manner in which a jaw is supported in the jaw bowl.

As shown in FIG. 8, each jaw 4 is provided with slots 30 in its sidewalls. These slots extend downwardly from the top parallel the sloped rear edge 29.

In turn, the sidewalls of the actuator slots 28 are provided with similarly sloping or angled ribs 31 which engage in the slots 30. As a result, when the jaw bowl actuator 5 moves upwardly, it will automatically effect the retraction of the jaws 4 from drill rod gripping relation thus eliminating the need for the conventional retraction spring arrangements.

While the jaws 4 are supported on all sides during the drilling operation, at the bottom and top by the bushings 13 and 16 (and also by the cap legs 10) and the sidewalls of the slots 3 and 28 to ensure against any independent movement between the jaw bowl and the remainder of the assembly, the jaw bowl 5 is provided with 3 guide pin receiving holes 32 to receive pins 33 carried by the pressure pad plate 8.

This arrangement ensures that there will be no jamming of the jaws allowing them to be easily removed from or dropped into the bowl. Further, this precision alignment arrangement prevents any misalignment of the springs which could cause uneven loading, eccentricity and run out vibration is eliminated.

Figure 6:
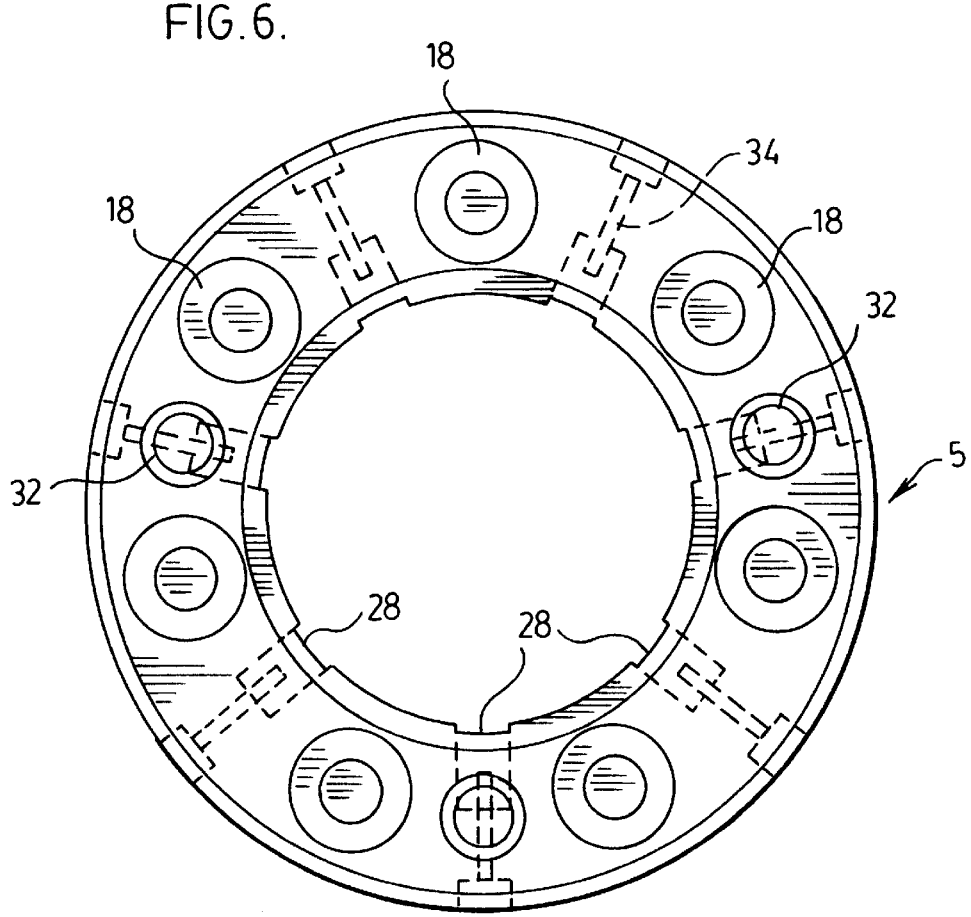
FIG. 6 is a planned view of the jaw bowl or actuator.
Figure 7:
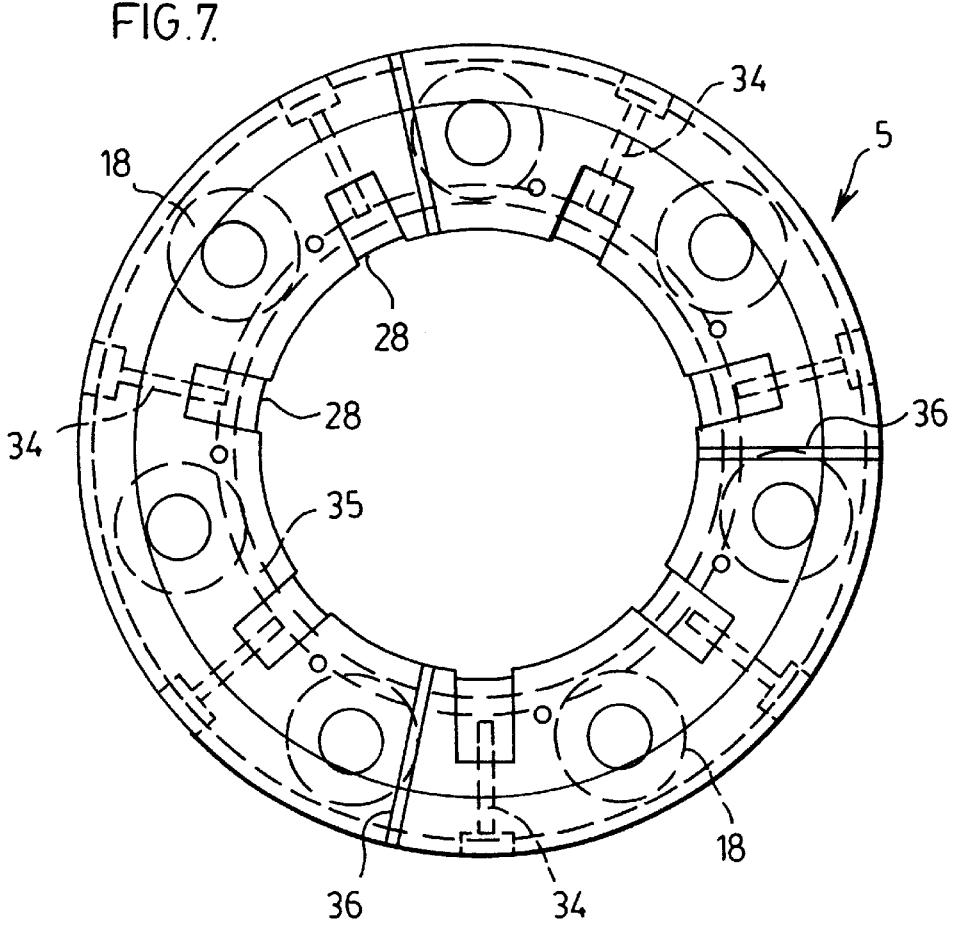
FIG. 7 is a view looking at the underside of the jaw bowl or actuator.

As shown in FIGS. 6 and 7 particularly, each of the jaw receiving slots 28 of the jaw bowl 5 is provided with individual grease feed passages 34. Further, the jaw bowl includes a circumferential grease passage 35 intersecting the slots 28 to allow lubricant to travel from one jaw to the next to ensure against over and under lubrication.

Further, as illustrated in FIG. 7, the underside of the jaw bowl 5 is provided with radial grooves or passages 36 through which any water inside the chuck (eg. running down the rod or expelled from leaky rod joints etc.) is driven against the inner diameter of the chuck by centrifugal force and expelled out through the grooves.

To prevent any water flowing down the spindle an O-ring 37 is mounted on the spindle as shown in FIG. 10.

Figure 9:
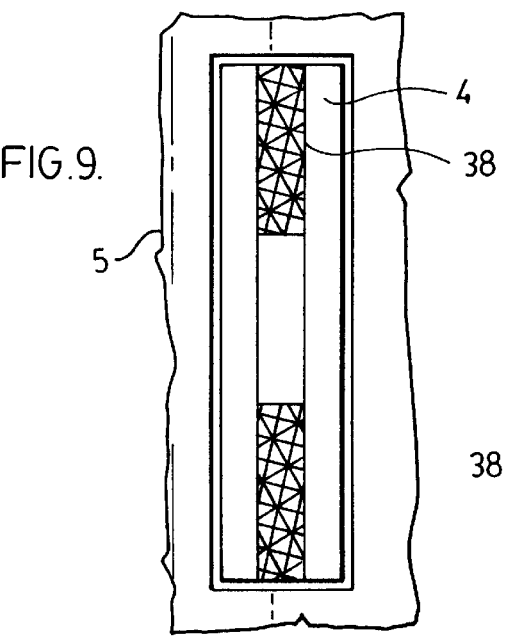
FIG. 9 is a broken away front elevational view of one of the jaws.

As illustrated in FIGS. 8 and 9, the jaws 4 are provided with carbide grippers 38. These grippers utilize an angled tooth pattern which increases the gripping strength since each tooth has a separate "plough" path through the rod material.

While the preferred embodiment of the invention has been particularly illustrated and described, it will be understood that various modifications may be made thereto without departing from the scope of the appended claims.

The embodiments of the invention in which an exclusive property or privilege is claimed are defined as follows:

1. A drill rod chuck for rotating a drill rod string, said chuck having a plurality of jaws moveable inwardly to a closed drill rod gripping position and outwardly to an open drill rod releasing position, an actuator for moving said jaws between said positions, compressed gas operated means exerting force on said actuator to close said jaws and an hydraulic operator for exerting force on said actuator to overcome the force of said compressed gas means to effect opening of said jaws, said compressed gas operated means comprising a plurality of compressed gas springs each comprising a cylinder containing compressed gas and a piston urged by said gas outwardly of said cylinder to the end of its stroke.

2. In a drill rod chuck as a rotatable spindle having slots in the upper end, jaws mounted in said spindle in said slots with their bottom edges contacting the bottoms of said slots, a jaw actuator bowl slideable on said spindle and supporting said jaws outside said spindle and adapted to move said jaws inwardly of said spindle on downward bowl movement on said spindle, a lower bushing mounted in said spindle to engage and support the bottom edges of said jaws, and an upper bushing fixed to and projecting downwardly into said spindle to engage the upper edges of said jaws as said jaws are moved inwardly to enter said spindle into drill rod gripping position, said bushings supporting said jaws against cantilever forces during drilling.

3. A drill rod as claimed in claim 1 in which such compressed gas springs are mounted on said actuator.

4. A drill rod chuck as claimed in claim 1 in which said actuator is a bowl slideably relative to said jaws to open and close said jaws and said compressed gas springs having their cylinders embedded in the upper surface of said actuator bowl and their pistons engaging a stop surface to urge said actuator away from said stop surface to said jaw closing position.

5. A drill rod chuck as claimed in claims 1, 3 or 4 in which said hydraulically actuated operator is non-rotating and is adapted to exert force on said actuator through a thrust bearing to move said actuator to open said jaws against the force of the compressed gas urging said actuator to close the jaws, said hydraulic actuated operator acting to withdraw said thrust bearing from running contact when operated to permit closing of said jaws.

6. A drill rod chuck for rotating a drill string, said chuck comprising a spindle to be driven from a power source, a plurality of jaws mounted on said spindle for radial movement into and out of closed drill rod gripping and open drill rod releasing positions, the radial movement into drill rod gripping position being determined by the diameter of the drill rod being gripped, an actuator bowl for moving said jaws between said closed and open positions, said actuator being slideably mounted on said spindle and rotatable therewith, a plurality of gas springs each comprising a cylinder filled with compressed gas and a piston urged outwardly of said cylinder by the compressed gas acting between said actuator bowl and a stop surface fixed to said spindle exerting force on said actuator bowl away from said stop surface to close said jaws, and an hydraulic operator for exerting force on said actuator bowl to overcome the force of said compressed gas springs to open said jaws.

7. A drill rod chuck as claimed in claim 6 in which, said cylinders of said gas springs are embedded in said actuator bowl and said pistons of said gas springs engage said stop surface.

8. A drill rod chuck as claimed in claims 6 or 7 in which said hydraulic operator is non-rotating and a thrust bearing is interposed between said hydraulic operator and said jaw actuator and said hydraulic operator is arranged to urge said jaw actuator to the jaw open position through said thrust bearing to accommodate relative rotation between said actuator and said hydraulic operator and to withdraw said thrust bearing out of force exerting running contact with said actuator when it is desired to close the jaws under the action of said gas springs.

9. A drill rod chuck as claimed in claim 8 in which a labyrinth seal plate rotatable with said spindle is provided between said hydraulic operator thrust bearing and said jaw actuator, said seal plate and hydraulic operator providing a tortuous path leading to the outside of said chuck.

10. A drill string chuck as claimed in claims 4 or 6 in which said jaws and said slideable actuator have relatively slideably interengaging means arranged to provide positive radial movement to said jaws on slideable movement of said actuator and to maintain said jaws from misalignment.

11. A drill string chuck as claimed in claim 9 in which said relatively slideably interengaging means comprises inclined key ways provided on one of said jaws and actuator and inclined keys provided in the other of said jaws and actuator said keys being slideably engaged in said key ways.

12. A drill string check as claimed in claim 9 provided with bushings to support said jaws when in drill rod gripping position against cantilever forces, said bushings comprising a lower bushing fixed in said spindle to underlie and support the bottoms of said jaws and an upper bushing fixed to said spindle to overlie and support the top of said jaws.

13. A drill rod chuck for rotating a drill string comprising a spindle adapted to be driven in rotation, said spindle having slots in its upper end, a seal plate slideably mounted on said spindle, stop means to limit downward movement of said seal plate, a jaw bowl slideably mounted on said spindle and fixed to said seal plate, said jaw bowl having jaw receiving undercut slots for registering with said slots in the upper end of said spindle, jaws mounted in said jaw bowl slots to be projected through said spindle slots into the interior of said spindle to grip a drill rod and to be withdrawn from drill rod gripping position upon sliding motion of said jaw bowl, a pressure plate secured to the upper end of said spindle, spring means acting between said jaw bowl and pressure plate to depress said jaw bowl to move said jaws inwardly to drill rod gripping position, a lower bushing mounted in said spindle to support the bottom edges of said jaws when they are moved into said spindle, a cap overlying said pressure plate and having depending legs projecting downwardly through notches in said pressure plate to engage in said spindle slots to overlie said jaws and prevent upward movement thereof, an upper bushing secured to said cap and depending down into said spindle to support the upper edges of said jaws when same are projected into said spindle, a non-rotating hydraulic operator slideable on said chuck below said seal plate, a thrust bearing interposed between said hydraulic operator and said seal plate, said hydraulic operator being adapted on upward movement to force said seal plate and said jaw bowl upwardly against the action of said spring means to effect the withdrawal of said jaws from drill rod gripping position and on downward movement to withdraw said thrust bearing from seal plate engagement to allow said spring means to move said jaw bowl downwardly to close said jaws.

14. A drill rod chuck as claimed in claim 13 in which said spring comprises gas springs.

15. A drill rod chuck as claimed in claim 14 having grease feed passage ways communicating with said jaw bowl slots.

16. A drill rod chuck as claimed in claim 15 in which said jaw bowl slots are interconnected by a circumferential grease passageway.

17. A drill rod chuck as claimed in claim 14 in which said gas springs comprise cylinders embedded in said jaw bowl and having pistons engaging said pressure plate.

18. A drill rod chuck as claimed in claim 14 having radial grooves for expelling water to the exterior.

19. A drill rod chuck as claimed in claim 14 in which said jaw bowl slots and said jaws have slideable interengaging means whereby downward movement of said bowl positively advances said jaws into drill rod gripping position and upward movement of said bowl positively withdraws said jaws out of drill rod gripping position.

20. A drill rod chuck as claimed in claim 14 in which locating pins are interposed between said jaw bowl and said pressure plate to locate said jaw bowl so that the jaw bowl slots accurately register with the slots in the top of said spindle.

21. A drill chuck as claimed in claim 14 in which said jaws are provided with carbide grippers having an angled tooth pattern with each tooth having a separate plough path through the rod material when gripping a drill rod.

22. In a drill rod chuck as claimed in claim 2, a pressure plate secured to said spindle, gas springs acting between said jaw bowl and pressure plate to move said bowl downwardly, and hydraulic means to move said bowl upwardly.

23. In a drill rod chuck as claimed in claim 2, or claim 22 in which said bowl has undercut slots to receive said jaws and support same against twisting, said bowl and said jaws being provided with relatively slideable interengaging means which are slideable relative to each other to effect positive withdrawal of said jaws on upward bowl movement.

* * * * *